United States Patent
Klamo et al.

(10) Patent No.: US 12,349,673 B2
(45) Date of Patent: Jul. 8, 2025

(54) EMULSIFIABLE CONCENTRATES

(71) Applicant: Dow Global Technologies LLC, Midland, MI (US)

(72) Inventors: Sara B. Klamo, Chicago, IL (US); David S. Laitar, Midland, MI (US); Keosha L. Cade, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 931 days.

(21) Appl. No.: 16/980,909

(22) PCT Filed: Apr. 23, 2019

(86) PCT No.: PCT/US2019/028714
§ 371 (c)(1),
(2) Date: Sep. 15, 2020

(87) PCT Pub. No.: WO2019/212803
PCT Pub. Date: Nov. 7, 2019

(65) Prior Publication Data
US 2021/0037816 A1    Feb. 11, 2021

Related U.S. Application Data

(60) Provisional application No. 62/664,994, filed on May 1, 2018.

(51) Int. Cl.
| | | |
|---|---|---|
| A01N 25/04 | (2006.01) | |
| A01N 37/10 | (2006.01) | |
| A01N 39/04 | (2006.01) | |
| A01N 43/40 | (2006.01) | |
| A01N 43/653 | (2006.01) | |
| A01N 53/00 | (2006.01) | |
| C05G 3/90 | (2020.01) | |

(52) U.S. Cl.
CPC ............ *A01N 25/04* (2013.01); *A01N 37/10* (2013.01); *A01N 39/04* (2013.01); *A01N 43/40* (2013.01); *A01N 43/653* (2013.01); *A01N 53/00* (2013.01); *C05G 3/90* (2020.02)

(58) Field of Classification Search
CPC ........ A01N 25/02; A01N 25/04; A01N 37/10; A01N 37/40; A01N 39/04; A01N 43/40; A01N 43/653; A01N 53/00; A01N 57/28
USPC ....................................................... 504/323
See application file for complete search history.

(56) References Cited

U.S. PATENT DOCUMENTS

| | | | | |
|---|---|---|---|---|
| 2,170,855 | A | * 8/1939 | Chitwood | ............... C07C 45/39 568/471 |
| 2,805,983 | A | 9/1957 | Horsley | |
| 5,874,631 | A | 2/1999 | Ross et al. | |

FOREIGN PATENT DOCUMENTS

| | | | |
|---|---|---|---|
| AU | 2013314269 | A1 | 4/2015 |
| BR | 112014030976 | A2 | 6/2017 |
| CN | 102653647 | A | 9/2012 |
| CN | 103857287 | * | 6/2014 |
| CN | 102924250 | B | 8/2015 |
| CN | 103608183 | B | 5/2017 |
| CN | 106103846 | B | 8/2018 |
| EP | 0764625 | A1 | 3/1997 |
| EP | 1354883 | A1 | 10/2003 |
| EP | 3052701 | B1 | 6/2017 |
| EP | 2999756 | B1 | 7/2017 |
| EP | 2723576 | B1 | 8/2017 |
| IN | 201400278 | I1 | 7/2016 |
| JP | 48068574 | | 9/1973 |
| JP | 57046933 | | 3/1982 |
| JP | 2001131106 | A | 5/2001 |
| JP | 2003104993 | A | 4/2003 |
| JP | 05044212 | | 7/2012 |
| WO | 1998000375 | A1 | 1/1998 |
| WO | 2010010005 | A2 | 1/2010 |
| WO | 2012074975 | A1 | 6/2012 |
| WO | 2016156286 | A1 | 10/2016 |

OTHER PUBLICATIONS

Spex CertiPrep, Antylia Scientific Company. Guide for Pesticide Solubility [online], Mar. 7, 2023 [retrieved on May 25, 2023]. Retrieved from the Internet:<URL: https://www.spex.com/getmedia/e2c57ab0-ab5f-4dc2-a63a-28a82edd70d9/Product-Guide-to-Pesticide-Solubility.pdf?ext=.pdf >.*
Horley et al., CN 103857287, English machine translation obtained on Feb. 28, 2024. (Year: 2024).*
Colpaert, Organic & Biomolecular Chemistry, 2011, 9, 549-558.
Jeyakumar, Synthesis, 2008, 5, 807-819.
Matsuda, Kiyo—Suzuka Kogyo Koto Senmon Gakko (1990), 23(2), 311-16.
Matsuda, Kiyo—Suzuka Kogyo Koto Senmon Gakko (1992), 25(1), 271-7.
Richey, Abstracts of Papers, 246th ACS National Meeting & Exposition, Indianapolis, IN, United States, Sep. 8-12, 2013.
PCT/US2019/028714, International Search Report and Written Opinion with a mailing date of Sep. 16, 2019.
PCT/US2019/028714, International Preliminary Report on Patentability with a mailing date of Nov. 12, 2020.

* cited by examiner

*Primary Examiner* — Genevieve S Alley
(74) *Attorney, Agent, or Firm* — Arthur R. Rogers

(57) ABSTRACT

Embodiments of the present invention relate to compositions that can be used as emulsifiable concentrates in the agriculture industry. In one aspect, a composition comprises (a) 5 weight percent or more of a compound soluble in at least one of N,N-dialkyl fatty amide, an aromatic ketone, an alkyl ketone, a cyclic ketone, or an aromatic hydrocarbon solvent; and (b) an ether ketone solvent according to Formula 1, as described herein, wherein $R_1$ is a linear or branched alkyl group having 4 to 8 carbon atoms, wherein $R_2$ is $CH_3$ or $CH_2CH_3$, wherein x is 0, 1, or 2, wherein $R_3$ is $CH_3$ when $R_2$ is $CH_3$, and wherein $R_3$ is $CH_2CH_3$ when $R_2$ is $CH_2CH_3$.

14 Claims, No Drawings

EMULSIFIABLE CONCENTRATES

FIELD

The present invention relates to compositions that can be used as emulsifiable concentrates in the agriculture industry.

INTRODUCTION

The agriculture industry utilizes organic solvents with polarity, low water solubility, and excellent solubilization of agrochemical active ingredients such as pesticides and fertilizer additives. Aromatic hydrocarbons are often used as solvents in emulsifiable concentrates. Many of these aromatic solvents exhibit adverse health effects and can negatively impact the environment. Also, many emulsifiable concentrates comprise one or more active ingredients (AI) that are not particularly soluble in aromatic hydrocarbon solvents, e.g., exhibit a solubility of less than 20%. Alternative solvents without, or at least with diminished health and environmental concerns and that can solubilize more than 20% of an AI are of continuing interest.

SUMMARY

The present invention provides alternative solvents that can solubilize desirable amounts of one or more active ingredients for use in agriculture related applications in some embodiments. Compositions incorporating such solvent(s) and active ingredient(s), in some embodiments, can advantageously provide diminished health and/or environmental concerns.

In one aspect, the present invention provides a composition that comprises (a) 5 weight percent or more of a compound soluble in at least one of N,N-dialkyl fatty amide, an aromatic ketone, an alkyl ketone, a cyclic ketone, or an aromatic hydrocarbon solvent; and (b) an ether ketone solvent according to Formula 1:

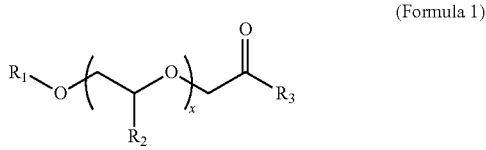

(Formula 1)

wherein $R_1$ is a linear or branched alkyl group having 4 to 8 carbon atoms, wherein $R_2$ is $CH_3$ or $CH_2CH_3$, wherein x is 0, 1, or 2, wherein $R_3$ is $CH_3$ when $R_2$ is $CH_3$, and wherein $R_3$ is $CH_2CH_3$ when $R_2$ is $CH_2CH_3$.

These and other embodiments are described in more detail in the Detailed Description.

DETAILED DESCRIPTION

As used herein, "a," "an," "the," "at least one," and "one or more" are used interchangeably.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include one or more additional compounds unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or", unless stated otherwise, refers to the listed members individually as well as in any combination. Use of the singular includes use of the plural and vice versa.

Also herein, the recitations of numerical ranges by endpoints include all numbers subsumed in that range (e.g., 1 to 5 includes 1, 1.5, 2, 2.75, 3, 3.80, 4, 5, etc.). For the purposes of the invention, it is to be understood, consistent with what one of ordinary skill in the art would understand, that a numerical range is intended to include and support all possible subranges that are included in that range. For example, the range from 1 to 100 is intended to convey from 1.01 to 100, from 1 to 99.99, from 1.01 to 99.99, from 40 to 60, from 1 to 55, etc.

Unless stated to the contrary, implicit from the context, or customary in the art, all parts and percents are based on weight and all test methods are current as of the filing date of this disclosure.

When a compound (e.g., an active ingredient) is characterized as being soluble in a solvent (e.g., "compound soluble in N,N-dialkyl fatty amide," "compound soluble in an aromatic ketone," "compound soluble in an alkyl ketone," "compound soluble in a cyclic ketone," "compound soluble in an aromatic hydrocarbon solvent," etc.), such term means that a compound is soluble in the specified solvent under ambient conditions, i.e., 23° C. and atmospheric pressure. In this context, solubility is defined by the approximate volume of solvent in milliliters (mL) needed to dissolve 1 gram (g) of solute. Table 1 provides a summary of common solubility descriptions.

TABLE 1

| Description | Volume of solvent (mL) Needed to Dissolve 1 g of Solute |
|---|---|
| Very Soluble | Less than 1 |
| Freely Soluble | 1 to 10 |
| Soluble | 10 to 30 |
| Sparingly Soluble | 30 to 100 |
| Slightly Soluble | 100 to 1000 |
| Very Slightly Soluble | 1000 to 10,000 |
| Practically Insoluble | Greater than 10,000 |

Methods for measurement of compound (e.g., active ingredient) solubility involve dissolving the solid solute in a solvent using agitation or shaking under specified temperature and time conditions. The saturated solution is then separated from the solid using filtration. The concentration of the solute in the saturated solution is determined by analysis using ultraviolet (UV) spectroscopy, high pressure liquid chromatography with evaporative light scattering, UV, or mass spectrometry detection or NMR spectroscopy.

"Aromatic hydrocarbon", "arene", "aryl hydrocarbon" and like terms mean a hydrocarbon with sigma bonds and delocalized pi electrons between carbon atoms forming monocyclic or polycyclic rings. Examples include, but are not limited to, benzene, toluene, naphthalene and the like.

"Hydrocarbon" and like terms mean a compound consisting only of carbon and hydrogen atoms.

"Solution" and like terms mean a homogeneous composition that is (1) variable, i.e., can exist in different concentrations of solute in solvent, (2) all but one component is present in simplest units, e.g., molecules, and (3) can be separated by physical methods into two or more pure substances. In the context of this invention, solution refers to liquid compositions.

"Composition" and like terms mean a mixture or blend of two or more components.

"Emulsion" and like terms mean a mixture of two or more liquids that are normally immiscible (unmixable or unblendable) with one another, i.e., the liquids do not form a solution.

"Emulsifiable concentrate" and like terms mean a formulation in which the concentrate is typically diluted in water to form a stable emulsion. "Stable" and like terms mean that the emulsion will exhibit little, if any, deterioration over 24 hours under ambient conditions, e.g., 23° C. and atmospheric pressure.

"Free of an aromatic hydrocarbon solvent" and like terms mean, in the context of the compositions of this invention, that the composition contains less than (<) 5, or <4, or <3, or <2, or <1, or <0.5, or <0.1, or <0.05, or <0.01, wt % of an aromatic hydrocarbon that can solubilize under ambient conditions (23° C. and atmospheric pressure) an aromatic hydrocarbon soluble compound such as pyrethroid, organophosphate, organosulfite, carbamate, cyclohexanedione, isoxazole, phenoxy, chlorophenoxyacetic, anilide, chloroacetanilide, chloromethoxy benzoic, oxyacetanilide, strobilurin, triazole, triazapentadiene, synthetic auxin, aryloxyphenoxy propionate, benzofuran, pyrimidine, phenylpyrazole, phenylurea, diphenyl ether, hydroxybenzonitrile, thiophosphoric triamide, and chloropyridine. Any such amount of aromatic hydrocarbon in the composition is typically present as a contaminant and is without any significant effect on the formation, maintenance and intended use of the composition. In one embodiment "free of an aromatic hydrocarbon solvent" means that the composition does not contain any amount of such solvent as measured by conventional gas chromatography (GC) or high pressure liquid chromatography (HPLC).

"Free of an N,N-dialkyl fatty amide solvent" and like terms mean, in the context of the compositions of this invention, that the composition contains less than (<) 5, or <4, or <3, or <2, or <1, or <0.5, or <0.1, or <0.05, or <0.01, wt % of N,N-dialkyl fatty amide that can solubilize under ambient conditions (23° C. and atmospheric pressure) compounds such as pyrethroid, organophosphate, organosulfite, carbamate, cyclohexanedione, isoxazole, phenoxy, chlorophenoxyacetic, anilide, chloroacetanilide, chloromethoxy benzoic, oxyacetanilide, strobilurin, triazole, triazapentadiene, synthetic auxin, aryloxyphenoxy propionate, benzofuran, pyrimidine, phenylpyrazole, phenylurea, diphenyl ether, hydroxybenzonitrile, thiophosphoric triamide, and chloropyridine. Any such amount of N,N-dialkyl fatty amide in the composition is typically present as a contaminant and is without any significant effect on the formation, maintenance and intended use of the composition. In one embodiment "free of an N,N-dialkyl fatty amide solvent" means that the composition does not contain any amount of such solvent as measured by conventional gas chromatography (GC) or high pressure liquid chromatography (HPLC).

"Free of an aromatic, alkyl, and cyclic ketone solvents" and like terms mean, in the context of the compositions of this invention, that the composition contains less than (<) 5, or <4, or <3, or <2, or <1, or <0.5, or <0.1, or <0.05, or <0.01, wt % of aromatic, alkyl, and cyclic ketone solvents that can solubilize under ambient conditions (23° C. and atmospheric pressure) compounds such as pyrethroid, organophosphate, organosulfite, carbamate, cyclohexanedione, isoxazole, phenoxy, chlorophenoxyacetic, anilide, chloroacetanilide, chloromethoxy benzoic, oxyacetanilide, strobilurin, triazole, triazapentadiene, synthetic auxin, aryloxyphenoxy propionate, benzofuran, pyrimidine, phenylpyrazole, phenylurea, diphenyl ether, hydroxybenzonitrile, thiophosphoric triamide, and chloropyridine. Any such amount of aromatic, alkyl, and cyclic ketone solvent in the composition is typically present as a contaminant and is without any significant effect on the formation, maintenance and intended use of the composition. In one embodiment "free of aromatic, alkyl, and cyclic ketone solvents" means that the composition does not contain any amount of such solvent as measured by conventional gas chromatography (GC) or high pressure liquid chromatography (HPLC).

Embodiments of the present invention generally relate to a compound (e.g., an active ingredient) and an ether ketone solvent according to Formula 1 as further described herein. Such compositions can be emulsifiable concentrates for use in agrochemical applications. For example, the composition can include agrochemical active ingredients such as pesticides, fertilizer stabilizers, and others. In one embodiment, a composition of the present invention comprises (a) 5 weight percent or more of a compound soluble in at least one of N,N-dialkyl fatty amide, an aromatic ketone, an alkyl ketone, a cyclic ketone, or an aromatic hydrocarbon solvent; and (b) an ether ketone solvent according to Formula 1:

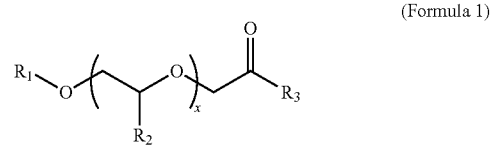

(Formula 1)

wherein $R_1$ is a linear or branched alkyl group having 4 to 8 carbon atoms, wherein $R_2$ is $CH_3$ or $CH_2CH_3$, wherein x is 0, 1, or 2, wherein $R_3$ is $CH_3$ when $R_2$ is $CH_3$, and wherein $R_3$ is $CH_2CH_3$ when $R_2$ is $CH_2CH_3$. In some embodiments of the present invention, the composition further comprises one or more additives such as one or more of a surfactant, emulsifier, dispersant, humectant, adjuvant, antioxidant or colorant.

Compound Soluble in at Least One of N,N-Dialkyl Fatty Amide, an Aromatic Ketone, an Alkyl Ketone, a Cyclic Ketone, or an Aromatic Hydrocarbon Solvent The first component of the compositions of this invention are compounds that are soluble in at least one of the following solvents: N,N-dialkyl fatty amide, an aromatic ketone, an alkyl ketone, a cyclic ketone, or an aromatic hydrocarbon solvent. As used herein, "an alkyl ketone" is defined according to Formula 2:

(Formula 2)

wherein $R_1$ and $R_2$ are independently linear or branched alkyl groups that are comprised of only carbon and hydrogen atoms. According to the definition of Formula 2, the only functional group in an alkyl ketone is the ketone carbonyl group and the only heteroatom in the alkyl ketone is the carbonyl oxygen atom.

The solubility of the compound in one or more of these solvents is important as the ether ketone solvent specified herein can serve as a desirable alternative to such solvents. Typically these compounds are at least one of the active ingredients in various agricultural compositions, e.g., pesticides, insecticides, herbicides, fungicides, fertilizer additives, etc. These compounds are typically water insoluble and include, but are not limited to, pyrethroid, organophosphate, organosulfite, carbamate, cyclohexanedione, isoxazole, phenoxy, chlorophenoxyacetic, anilide, chloroacetanilide, chloromethoxy benzoic, oxyacetanilide, strobilurin, triazole, triazapentadiene, synthetic auxin, aryloxyphenoxy propionate, benzofuran, pyrimidine, phenylpyrazole, phenylurea, diphenyl ether, hydroxybenzonitrile, thiophosphoric triamide, and chloropyridine. In some embodiments, the compound that is soluble in at least one of N,N-dialkyl fatty amide, an aromatic ketone, an alkyl ketone, a cyclic ketone, or an aromatic hydrocarbon solvent is at least one of bifenthrin, tebuconazole, 2-methyl-4-chlorophenoxyacetic acid, 2,4-dichlorophenoxyacetic acid, N-(n-butyl)thiophosphoric triamide, dicamba acid, and nitrapyrin. Specific fertilizer additives include, but are not limited to, N-(n-butyl) thiophosphoric triamide and nitrapyrin.

The compound that is soluble in at least one of N,N-dialkyl fatty amide, aromatic ketone, alkyl ketone, cyclic ketone, and aromatic hydrocarbon compound comprises greater than (>) 5, or greater than or equal to (≥) 10, or ≥15, weight percent (wt %) of the composition. In some embodiments, compound comprises less than or equal to (≤) 20 wt % of the composition.

In some embodiments, the composition can provide a higher concentration of the compound. In some such embodiments, the compound that is soluble in at least one of N,N-dialkyl fatty amide, aromatic ketone, alkyl ketone, cyclic ketone, and aromatic hydrocarbon compound comprises greater than (>) 20, or greater than or equal to (≥) 25, ≥30, ≥35, ≥40, or ≥45 weight percent (wt %) of the composition. In some embodiments, compound comprises less than or equal to (≤) 50 wt % of the composition.

Ether Ketone Solvent and Other Solvents

The second component of compositions of the present invention is an ether ketone solvent according to Formula 1:

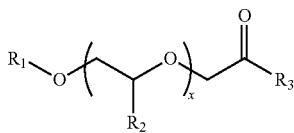

(Formula 1)

wherein $R_1$ is a linear or branched alkyl group having 4 to 8 carbon atoms, wherein $R_2$ is $CH_3$ or $CH_2CH_3$, wherein x is 0, 1, or 2, wherein $R_3$ is $CH_3$ when $R_2$ is $CH_3$, and wherein $R_3$ is $CH_2CH_3$ when $R_2$ is $CH_2CH_3$. In some embodiments, $R_1$ is a linear alkyl group having 4 or 5 carbon atoms, $R_2$ is $CH_3$, x is 0 or 1, and $R_3$ is $CH_3$.

The ether ketone solvent of Formula 1 described herein can, in some embodiments, advantageously provide high solubility for several classes of active ingredients (e.g., component (a) compounds). This can advantageously facilitate the formulation of multiple active ingredients in a single emulsifiable concentrate formulation.

In some embodiments, the above-described ether ketone solvent of Formula 1 comprises greater than or equal to (≥) 10, ≥20, ≥30, ≥40, ≥50, ≥60, ≥70, ≥75, ≥80, ≥85, ≥90 weight percent (wt %) of the composition. In some embodiments, compound comprises less than or equal to (≤) 95, ≤90, ≤85, ≤80, ≤75, ≤70, ≤60, or ≤50 wt % of the composition.

In some embodiments, the composition can provide a higher concentration of the component (a) compound (e.g., active ingredient). In some such embodiments, the above-described ether ketone solvent of Formula 1 comprises greater than or equal to (≥) 10, ≥20, ≥30, ≥40, or ≥45 weight percent (wt %) of the composition. In some embodiments, compound comprises less than or equal to (≤) 50, ≤45, ≤40, ≤35, or ≤30 wt % of the composition.

The ether ketone solvent of Formula 1 described herein can, in some embodiments, also reduce or eliminate the use of solvents with undesirable physical, human, and/or environmental hazards in some applications.

In some embodiments, the ether ketone solvent is the only solvent in the composition of the present invention.

In some embodiments, the composition of the present invention contains less than (<) 50, or less than or equal to (≤) 40, or ≤30, or ≤20, or ≤10, or ≤5 wt % of an N,N-dialkyl fatty amide solvent. In one embodiment, the composition of the present invention is free of an N,N-dialkyl fatty amide solvent.

In some embodiments, the composition of the present invention contains less than (<) 50, or less than or equal to (≤) 40, or ≤30, or ≤20, or ≤10, or ≤5 wt % of aromatic hydrocarbon solvents. In one embodiment, the composition of the present invention is free of aromatic hydrocarbon solvents.

In some embodiments, the composition of the present invention contains less than (<) 50, or less than or equal to (≤) 40, or ≤30, or ≤20, or ≤10, or ≤5 wt % of aromatic ketone solvents. In one embodiment, the composition of the present invention is free of aromatic ketone solvents.

In some embodiments, the composition of the present invention contains less than (<) 50, or less than or equal to (≤) 40, or ≤30, or ≤20, or ≤10, or ≤5 wt % of alkyl ketone solvents. In one embodiment, the composition of the present invention is free of alkyl ketone solvents.

In some embodiments, the composition of the present invention contains less than (<) 50, or less than or equal to (≤) 40, or ≤30, or ≤20, or ≤10, or ≤5 wt % of cyclic ketone solvents. In one embodiment, the composition of the present invention is free of cyclic ketone solvents.

In some embodiments, the composition of the present invention contains less than (<) 50, or less than or equal to (≤) 40, or ≤30, or ≤20, or ≤10, or ≤5 wt % of aromatic, alkyl, and cyclic ketone solvents. In one embodiment, the composition of the present invention is free of aromatic, alkyl, and cyclic ketone solvents.

In some embodiments, the total amount of N,N-dialkyl fatty amide solvents, aromatic ketone solvents, alkyl ketone solvents, cyclic ketone solvents, and aromatic hydrocarbon solvents in a composition of the present invention is less than (<) 50, or less than or equal to (≤) 40, or ≤30, or ≤20, or ≤10, or ≤5 wt %. In one embodiment, the composition of the present invention is free of N,N-dialkyl fatty amide solvents, aromatic ketone solvents, alkyl ketone solvents, cyclic ketone solvents, and aromatic hydrocarbon solvents.

Potential Additives

In one embodiment the compositions of this invention can comprise more than two components. In one embodiment the compositions of this invention comprise one or more of a surfactant, emulsifier, dispersant, humectant, antioxidant, colorant, adjuvant or other additive.

Surfactants useful in the invention can be anionic, nonionic or cationic in character and can function as wetting agents, suspending agents, anti-foaming and defoaming agents, along with other functions. Blends of anionic and nonionic surfactants are commonly utilized. Surfactants conventionally used in agricultural formulations are described in *Encyclopedia of Surfactants*, Vol. I-II, Chemical Publishing Co., New York, 1980-81 and in *McCutcheon's Detergents and Emulsifiers Annual*, MC Publishing Corp., Ridgewood, New Jersey, 1998. Typical surfactants include, but are not limited to, alkylphenol-alkylene oxide addition products, such as nonylphenol-C18 ethoxylate, alcohol-alkylene oxide addition products, such as tridecyl alcohol-C16 ethoxylate, quaternary amines, such as lauryl trimethyl ammonium chloride, salts of mono and dialkyl phosphate esters, and solid or liquid organosilicones. Examples of useful organosilicone surfactants include commercially available polysiloxane/polyether copolymers such as TEGOSTAB B-8462, B-8404 and B-8871, available from Evonik AG, and VORASURF™ DC-198 and DC-5043 surfactants, available from The Dow Chemical Company, and NIAX L-618 and NIAX L-627 surfactants from Momentive Performance Materials.

Representative emulsifiers include, but are not limited to, anionic emulsifiers such as alkaline earth, alkali metal, and amine salts of dodecyl benzene sulfonic acid, alkylarylsulfonic acids, and alkylnapthalenesulfonic acids, sodium dialkyl sulfosuccinate, sodium diisoctylsulfosuccinate, and amine salts of ether sulfates. Nonionic emulsifiers include fatty acid alkanolamides, condensation products of fatty alcohols, fatty amines, fatty acid esters, and fatty acid amides with ethylene oxide and/or propylene oxide, condensation products of linear or branched primary alcohols with ethylene oxide and/or propylene oxide, condensation products of linear or branched secondary alcohols with ethylene oxide and/or propylene oxide, fatty esters of polyhydric alcohol esters such as sorbitan fatty acid esters, condensation products of fatty esters of polyhydric alcohol esters with ethylene oxide such as polyoxyethylene sorbitan fatty acid esters, ethoxylated lanolin alcohols, ethoxylated lanolin acids. Cationic emulsifiers include aliphatic mono-, di-, or polyamine acetates and oleates. Combination anionic and nonionic emulsifier products available as preblended products include, for example, TENSIOFIX B.7416, B.7438, and B.7453 and ATLOX 4851B and 4855B.

Representative dispersants include, but are not limited to, nonionic surfactants and wetting agents such as those prepared by the sequential addition of propylene oxide and then ethylene oxide to propylene glycol, block copolymers of ethylene oxide and propylene oxide, and condensation products of linear alcohols with ethylene oxide and propylene oxide, such as butanol ethylene oxide or propylene oxide copolymer.

Representative humectants include, but are not limited to, propylene glycol, glycerol, and polyethylene glycol.

Representative adjuvants include, but are not limited to, spreaders, petroleum and plant derived oils and solvents, wetting agents. Adjuvants useful in emulsifiable concentrate compositions are described in *Compendium of Herbicide Adjuvants*, 9th Edition, edited by Bryan Young, Dept. of Plant, Soil, and Agricultural Systems, Southern Illinois University, MC-4415, 1205 Lincoln Dr., Carbondale, IL 62901. Examples of adjuvants include, but are not limited to, alkyl polysaccharides and blends, amine ethoxylates, polyethylene glycol esters, ethoxylated alkyl aryl phosphate esters, paraffin oil, horticultural spray oils, methylated rape seed oil, methylated soybean oil, refined vegetable oil, 2-ethyl hexyl stearate, n-butyl oleate, propylene glycol dioleate, isopropyl myristate, and ethylene vinyl acetate terpolymers.

The total amount of additives in the inventive composition, if present, comprises greater than (>) 0, or greater than or equal to (≥) 0.5, or ≥1, or ≥1.5 weight percent (wt %) of the composition. Typically the total amount of additives in the composition comprises less than or equal to (≤) 15, or ≤10, or ≤5, or ≤3 wt % of the composition. In one embodiment the total amount of additives in the composition comprises from >0 to ≤15, or from ≥0.5 to ≤10, or from ≥1 to ≤5, wt % of the composition.

Compositions

In one embodiment, a composition of the present invention comprises (a) 5 weight percent or more of a compound soluble in at least one of N,N-dialkyl fatty amide, an aromatic ketone, an alkyl ketone, a cyclic ketone, or an aromatic hydrocarbon solvent; and (b) an ether ketone solvent according to Formula 1:

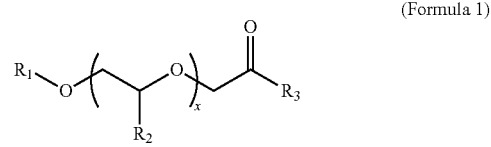

(Formula 1)

wherein $R_1$ is a linear or branched alkyl group having 4 to 8 carbon atoms, wherein $R_2$ is $CH_3$ or $CH_2CH_3$, wherein x is 0, 1, or 2, wherein $R_3$ is $CH_3$ when $R_2$ is $CH_3$, and wherein $R_3$ is $CH_2CH_3$ when $R_2$ is $CH_2CH_3$. In some embodiments, the composition comprises up to 20 weight percent of the one or more component (a) compounds and 10 to 80 weight percent of the ether ketone solvent. The composition, in some embodiments, comprises 5 to 20 weight percent of the one or more component (a) compounds and 10 to 80 weight percent of the ether ketone solvent. In some embodiments, the composition comprises 5 to 20 weight percent of the one or more component (a) compounds and 80 to 95 weight percent of the ether ketone solvent. The composition, in some embodiments, comprises 21 to 50 weight percent of the one or more component (a) compounds and 10 to 50 weight percent of the ether ketone solvent. In some embodiments, the ether ketone solvent is the only solvent for the composition.

In some embodiments, the composition comprises less than 50 weight percent of an aromatic hydrocarbon solvent. The composition, in some embodiments, is free of an aromatic hydrocarbon solvent.

In some embodiments, the composition comprises less than 50 weight percent of an N,N-dialkyl fatty amide solvent. The composition, in some embodiments, is free of an N,N-dialkyl fatty amide solvent.

In some embodiments, the composition comprises less than 50 weight percent of aromatic, alkyl, and cyclic ketone solvents. The composition, in some embodiments, is free of aromatic, alkyl, and cyclic ketone solvents.

Regarding the component (a) compound that is soluble in at least one of N,N-dialkyl fatty amide, an aromatic ketone, an alkyl ketone, a cyclic ketone, or an aromatic hydrocarbon solvent, in some embodiments, the component (a) compound is at least one of a pyrethroid, organophosphate, organosulfite, carbamate, cyclohexanedione, isoxazole, phenoxy, chlorophenoxyacetic, anilide, chloroacetanilide, chloromethoxy benzoic, oxyacetanilide, strobilurin, triazole, triazapentadiene, synthetic auxin, aryloxyphenoxy propionate, benzofuran, pyrimidine, phenylpyrazole, phenylurea, diphenyl ether, hydroxybenzonitrile, thiophosphoric triamide, and chloropyridine. In some embodiments, the component (a) compound is at least one of bifenthrin, tebuconazole, 2-methyl-4-chlorophenoxyacetic acid, 2,4-dichlorophenoxyacetic acid, N-(n-butyl)thiophosphoric triamide, dicamba acid, and nitrapyrin.

In some embodiments of the present invention, the composition further comprises one or more of a surfactant, emulsifier, dispersant, humectant, adjuvant, antioxidant or colorant wherein the one or more of a surfactant, emulsifier, dispersant, humectant, adjuvant, antioxidant or colorant comprises from greater than zero to less than or equal to weight percent of the composition.

Compositions of the present invention can be prepared as emulsifiable concentrates. Such emulsifiable concentrates can be prepared in vessels or tanks having agitators for mixing or high shear mixing. All equipment and piping utilized is typically dry and free from moisture or residues of water. Nitrogen may be used to flush air from the process system prior to generation of the emulsifiable concentrate product. Composition components, including active ingredients, fertilizer additives, solvents, surfactants, emulsifiers, dispersants, humectants, adjuvants, antioxidants or colorants are added to the process vessel sequentially, as single components or in groups, with agitation. The components of the emulsifiable concentrate may be added in liquid, solid, or molten forms. The composition is mixed at controlled temperature, typically of 25 to 30° C., for 1 to 2 hours or until a homogeneous solution is obtained. In some cases elevated temperatures are utilized to form the homogeneous solution, for example between 30 and 80° C. In some cases, the emulsifiable concentrate solution may be filtered using a GAF or similar filter.

Some embodiments of the invention will now be described in detail in the following Examples.

EXAMPLES

The following examples are given to illustrate the invention and should not be construed as limiting its scope. All parts and percentages are by weight unless otherwise indicated.

The following solvents are evaluated in the below Examples:

TABLE 2

| Solvent | Source |
| --- | --- |
| 1-Butoxy-2-propanone ("PnB Ketone") | Experimental |
| 1-Pentyloxy-2-propanone ("PnPent Ketone") | Experimental |
| 1-Octyloxy-2-propanone ("PnO Ketone") | Experimental |
| 1-((1-(Butoxy)-2-propanyl)oxy)-2-propanone ("DPnB Ketone") | Experimental |
| 1-((1-(Pentyloxy)-2-propanyl)oxy)-2-propanone ("DPnPent Ketone") | Experimental |
| 1-((1-(Hexyloxy)-2-propanyl)oxy)-2-propanone ("DPnH Ketone") | Experimental |
| 1-((1-((1-Butoxy-2-propanyl)oxy)-2-propanyl)oxy)-2-propanone ("TPnB Ketone") | Experimental |
| 1-Butoxy-2-butanone ("BnB Ketone") | Experimental |
| 1-Hexyloxy-2-butanone ("BnH Ketone") | Experimental |
| 1-Octyloxy-2-butanone ("BnO Ketone") | Experimental |
| 1-((1-Butoxy-2-butanyl)oxy)-2-butanone ("DBnB Ketone") | Experimental |
| 1-((1-(Hexyloxy)-2-butanyl)oxy)-2-butanone ("DBnH Ketone") | Experimental |
| Aromatic Hydrocarbon Solvent ("Aromatic 150") | Aromatic 150 from Exxon Mobil Corporation |
| $C_8$-$C_{10}$ Fatty Acid Dimethylamide ("AMD 810") | Agnique AMD810 from BASF Corporation |
| Acetophenone ("Acetophenone") | Fisher Scientific |
| Cyclohexanone ("Cyclohexanone") | Fisher Scientific |
| Isobutyl Heptyl Ketone ("ECOSOFT ™ Solvent IK") | ECOSOFT ™ Solvent IK from The Dow Chemical Company |

PnB Ketone ($R_1$=n-butyl, $R_2$=$R_3$=$CH_3$, x=0), PnPent Ketone ($R_1$=n-pentyl, $R_2$=$R_3$=$CH_3$, x=0), PnO Ketone ($R_1$=n-octyl, $R_2$=$R_3$=$CH_3$, x=0), DPnB Ketone ($R_1$=n-butyl, $R_2$=$R_3$=$CH_3$, x=1), DPnPent Ketone ($R_1$=n-pentyl, $R_2$=$R_3$=$CH_3$, x=1), DPnH Ketone ($R_1$=n-hexyl, $R_2$=$R_3$=$CH_3$, x=1), TPnB Ketone ($R_1$=n-butyl, $R_2$=$R_3$=$CH_3$, x=2), BnB Ketone ($R_1$=n-butyl, $R_2$=$R_3$=$CH_2CH_3$, x=0), BnH Ketone ($R_1$=n-hexyl, $R_2$=$R_3$=$CH_2CH_3$, x=0), BnO Ketone ($R_1$=n-octyl, $R_2$=$R_3$=$CH_2CH_3$, x=0), DBnB Ketone ($R_1$=n-butyl, $R_2$=$R_3$=$CH_2CH_3$, x=1), and DBnH Ketone ($R_1$=n-hexyl, $R_2$=$R_3$=$CH_2CH_3$, x=1) are ether ketone solvents that fall within Formula 1, wherein $R_1$ is a linear or branched alkyl group having 4 to 8 carbon atoms, wherein $R_2$ is $CH_3$ or $CH_2CH_3$, wherein x is 0, 1, or 2, wherein $R_3$ is $CH_3$ when $R_2$ is $CH_3$, and wherein $R_3$ is $CH_2CH_3$ when $R_2$ is $CH_2CH_3$ (collectively, "the Ether Ketone Solvents"). Such Ether Ketone Solvents can each be used in various embodiments of the present invention. The designation of "Experimental" for Source in Table 2 indicates that the solvents were prepared as described below.

Preparation of Ether Ketone Solvents

The Ether Ketone Solvents in Table 2 are prepared by adapting a published literature procedure (*Org. Lett.* 2001, 3, 3041) for the oxidation of secondary alcohols. All ether ketones are distilled prior to use in purities typically greater than 95% as determined by GC analysis. Certain high boiling ether ketone solvents (DPnH Ketone, BnO Ketone, DBnH Ketone and TPnB Ketone) are somewhat less pure, still >85% as determined by GC analysis.

Preparation of 1-(butoxy)-2-propanone (PnB Ketone)

An Erlenmeyer flask equipped with a stir bar and a thermocouple is charged with 1-butoxy-2-propanol (125 g, 656 mmol), dichloromethane (657 mL), 2,2,6,6-tetramethylpiperidine 1-oxyl ("TEMPO") (1.03 g, 6.57 mmol) and cooled to 5° C. (temperature was monitored with a thermometer) using an ice bath. Trichloroisocyanuric acid (160 g, 689 mmol) is added in small portions using a spatula over an hour. The mixture is stirred for an additional hour at 0° C. and then warmed to room temperature and stirred for 2 more hours. The mixture is filtered and cooled to 5° C. 200 mL of saturated aqueous sodium carbonate is added and the organic layer separated. Another 200 mL of saturated aqueous sodium carbonate is added along with 20 mL saturated aqueous sodium sulfite. The organic layer is separated and washed with brine (2×600 mL) and dried over magnesium sulfate. After filtering, the mixture is concentrated to a yellowish oil (103 g). The oil is fractionally distilled under vacuum (~1×10$^{-2}$ torr) to afford a clear yellow oil (86 g). Analysis by GC and NMR spectroscopy supports isolation of product in >90% purity.

Preparation of 1-(Pentyloxy)-2-propanone (PnPent Ketone)

An Erlenmeyer flask is equipped with a magnetic stir bar and a thermocouple, and charged with 1-(pentyloxy)-2-propanol (160.00 g, 968.34 mmol), dichloromethane (485 mL), and TEMPO (1.52 g, 9.70 mmol). The light orange solution was cooled to 5° C. via an ice bath. Trichloroisocyanuric acid (237.43 g, 1021.64 mmol) is added in small portions to control the reaction exotherm. The resulting orange mixture is stirred at 0° C. via an ice bath for 1 hour, then at room temperature for an additional 2 hours. The mixture is filtered and the resulting orange solution is cooled to 5° C. via ice bath. A saturated solution of aqueous sodium carbonate (200 mL) is added. The organic phase is separated and stirred overnight at room temperature with additional saturated aqueous sodium carbonate (200 mL) and a saturated solution of aqueous sodium sulfite (20 mL). The organic phase is separated, washed with brine (2×600 mL portions), dried over magnesium sulfate, filtered, and concentrated by rotary evaporation to afford a crude yellow oil (147.78 g). The material is fractionally distilled under vacuum (~1×10$^{-2}$ torr) to afford a light yellow tinted oil of a light yellow oil (96.08 g, >98.6% purity determined by GC analysis).

Preparation of 1-(Octyloxy)-2-propanone (PnO Ketone)

An Erlenmeyer flask is equipped with a magnetic stir bar and a thermocouple. The flask is charged with 1-(octyloxy)-2-propanol (180.00 g, 955.87 mmol), dichloromethane (480 mL), and TEMPO (1.50 g, 9.58 mmol). The light orange solution is cooled to 5° C. (temperature was monitored via thermometer) via an ice bath. Trichloroisocyanuric acid (234.28 g, 1008.09 mmol) is added in small portions via spatula to control the temperature. The resulting orange mixture is stirred at 0° C. via an ice bath for 1 hour, then the ice bath is removed and the mixture is stirred at room temperature for an additional 2 hours. The mixture is filtered and the resulting orange solution is cooled to 5° C. via ice bath. A saturated solution of aqueous sodium carbonate (200 mL) is added. The organic phase is separated and stirred at room temperature overnight with additional saturated aqueous sodium carbonate (200 mL) and a saturated solution of aqueous sodium sulfite (20 mL). The organic phase is separated, washed with brine (2×600 mL portions), dried over magnesium sulfate, filtered, and concentrated by rotary evaporation to afford a crude yellow oil (140.78 g). The material is distilled under vacuum (1×10$^{-2}$ torr) to afford 82.5 g that was >98.3% purity by GC.

Preparation of 1-((1-(Butoxy)-2-propanyl)oxy)-2-propanone (DPnB Ketone)

In a fume hood, a 2 L Erlenmeyer flask is charged with 1-((1-(Butoxy)-2-propanyl)oxy)-2-propanol (225 mL, 1.05 mol), dichloromethane 525 mL), TEMPO (1.64 g, 10.51 mmol) and cooled to 5° C. (temperature was monitored with a thermometer) using an ice bath. Trichloroisocyanuric acid (269.3 g, 1.10 mol) is added in small portions using a spatula over an hour. The mixture is stirred for an additional hour at 0° C. and then warmed to room temperature and stirred for 1 more hour. The mixture is filtered and cooled to 5° C. 200 mL of saturated aqueous sodium carbonate is added and the organic layer separated. Another 200 mL of saturated aqueous sodium carbonate is added along with 20 mL saturated aqueous sodium sulfite. The organic layer is separated and washed with brine (2×600 mL) and dried over magnesium sulfate. After filtering, the mixture is concentrated to a yellowish oil (160 g). The oil is fractionally distilled under vacuum (~1×10−2 torr) to afford a colorless middle fraction (84.0 g, >98% purity as determined by GC analysis).

Preparation of 1-((1-(pentyloxy)-2-propanyl)oxy)-2-propanone (DPnPent Ketone)

An Erlenmeyer flask is equipped with a magnetic stir bar and a thermocouple. The flask is charged with 1-((1-(pentyloxy)-2-propanyl)oxy)-2-propanol (160.00 g, 963.06 mmol), dichloromethane (350 mL), and TEMPO (1.09 g, 7.00 mmol). The light orange solution is cooled to 5° C. (temperature was monitored via thermometer) via an ice bath. Trichloroisocyanuric acid (170.23 g, 732.49 mmol) is added in small portions via spatula to control the temperature. The resulting orange mixture is stirred at 0° C. via an ice bath for 1 hour, then the ice bath is removed and the mixture is stirred at room temperature for an additional 2 hours. The mixture is filtered and the resulting orange solution is cooled to 5° C. A saturated solution of aqueous sodium carbonate (200 mL) is added. The organic phase is separated and stirred at room temperature overnight with additional saturated aqueous sodium carbonate (200 mL) and a saturated solution of aqueous sodium sulfite (20 mL). The organic phase is separated, washed with brine (2×600 mL portions), dried over magnesium sulfate, filtered, and concentrated by rotary evaporation to afford a crude yellow oil (144.05 g). The material is fractionally distilled under vacuum (1×10$^{-2}$ torr) to afford an orange-yellow oil (49.17 g, >96.4 purity determined by GC).

Preparation of 1-((1-(Hexyloxy)-2-propanyl)oxy)-2-propanone (DPnH Ketone)

An Erlenmeyer flask is equipped with a magnetic stir bar and a thermocouple. The flask is charged with 1-((1-(hexyloxy)-2-propanyl)oxy)-2-propanol (182.85 g, 837.44 mmol), dichloromethane (418 mL), and TEMPO (1.31 g, 8.38 mmol). The light orange solution is cooled to 5° C. Trichloroisocyanuric acid (206.05 g, 886.62 mmol) is added in small portions to control the reaction exotherm. The resulting orange mixture is stirred at 0° C. via ice bath for 1 hour, then the ice bath is removed and the mixture is stirred at room temperature for an additional 2 hours. The mixture is filtered and the resulting orange solution is cooled to 5° C. via an ice bath. A saturated solution of aqueous sodium carbonate (200 mL) is added. The organic phase is separated and stirred overnight at room temperature with additional saturated aqueous sodium carbonate (200 mL) and a saturated solution of aqueous sodium sulfite (20 mL). The organic phase is separated, washed with brine (2×600 mL portions), dried over magnesium sulfate, filtered, and concentrated by rotary evaporation to afford a crude orange-yellow oil (172.50 g). The material is distilled under vacuum (~1×10−2 torr) to afford 29.4 g of product that is >90.2% purity by GC.

Preparation of 1-((1-((1-Butoxy-2-propanyl)oxy)-2-propanyl)oxy)-2-propanone (TPnB Ketone)

An Erlenmeyer flask is equipped with a magnetic stir bar and a thermocouple. The flask is charged with 1-((1-((1-Butoxy-2-propanyl)oxy)-2-propanyl)oxy)-2-propanol (180.00 g, 724.75 mmol), dichloromethane (365 mL), and TEMPO (1.14 g, 7.30 mmol). The light orange solution is cooled to 5° C. Trichloroisocyanuric acid (177.85 g, 765.28 mmol) is added in small portions to minimize reaction exotherm. The resulting orange mixture is stirred at 0° C. via an ice bath for 1 hour, and the mixture is stirred at room temperature for an additional 2 hours. The mixture is filtered and the resulting orange solution is cooled to 5° C. A saturated solution of aqueous sodium carbonate (200 mL) is added. The organic phase is separated and stirred at room temperature overnight with additional saturated aqueous sodium carbonate (200 mL) and a saturated solution of aqueous sodium sulfite (20 mL). The mixture is stirred at room temperature overnight. The organic phase is separated, washed with brine (2×600 mL portions), dried over magnesium sulfate, filtered, and concentrated to afford a crude yellow oil (137.48 g). The material is fractionally distilled under vacuum (1×10-2 torr) to afford 13.65 g of a dark yellow oil that is 90.3% purity by GC.

Preparation of 1-Butoxy-2-butanone (BnB Ketone)

An Erlenmeyer flask is equipped with a magnetic stir bar and a thermocouple. The flask is charged with 1-butoxy-2-butanol (160.00 g, 1094.17 mmol), dichloromethane (550 mL), and TEMPO (1.71 g, 10.95 mmol). The light orange solution is cooled to 5° C. via an ice bath. Trichloroisocyanuric acid (267.35 g, 1150.39 mmol) is added in small portions over about an hour to minimize reaction exotherm. The resulting orange mixture is stirred in the ice bath for 1 hour and at room temperature for an additional 2 hours. The mixture is filtered and the resulting orange solution is cooled to 5° C. A saturated solution of aqueous sodium carbonate (200 mL) is added and the mixture is stirred vigorously for 10 minutes. The organic phase is separated and stirred at room temperature overnight with additional saturated aqueous sodium carbonate (200 mL) and a saturated solution of aqueous sodium sulfite (20 mL). The organic phase is separated, washed with brine (2×600 mL portions), dried over magnesium sulfate, filtered, and concentrated to afford a yellow oil (150.95 g). The material is fractionally distilled under vacuum (~1×10-2 torr) to afford a faintly yellow oil (96.19 g, >99% purity).

Preparation of 1-(Hexyloxy)-2-butanone (BnH Ketone)

An Erlenmeyer flask is equipped with a magnetic stir bar and a thermocouple. The flask is charged with 1-(hexyloxy)-2-butanol (168.80 g, 968.56 mmol), dichloromethane (485 mL), and TEMPO (1.53 g, 9.77 mmol). The light orange solution is cooled to 5° C. Trichloroisocyanuric acid (237.00 g, 1019.79 mmol) is added in small portions to control the reaction exotherm. The resulting orange mixture is stirred at 0° C. via an ice bath for 1 hour, then the ice bath is removed and the mixture is stirred at room temperature for an additional 2 hours. The mixture is filtered and the resulting orange solution is cooled to 5° C. via an ice bath. A saturated solution of aqueous sodium carbonate (200 mL) is added. The organic phase is separated and stirred overnight with additional saturated aqueous sodium carbonate (200 mL) and a saturated solution of aqueous sodium sulfite (20 mL). The organic phase is separated, washed with brine (2×600 mL portions), dried over magnesium sulfate, filtered, and concentrated to afford a crude yellow oil (170.30 g). The material is fractionally distilled under vacuum (1×10-2 torr) to afford 110.6 g of product that is >97.8% purity by GC.

Preparation of 1-(Octyloxy)-2-butanone (BnO Ketone)

An Erlenmeyer flask is equipped with a magnetic stir bar and a thermocouple. The flask is charged with 1-(octyloxy)-2-butanol (165.40 g, 817.43 mmol), dichloromethane (410 mL), and TEMPO (1.28 g, 8.22 mmol). The light orange solution is cooled to 5° C. Trichloroisocyanuric acid (200.70 g, 863.60 mmol) is added in small portions via spatula to control the reaction exotherm. The resulting orange mixture is stirred at 0° C. for 1 hour, then at room temperature for an additional 2 hours. The mixture is filtered and the resulting orange solution is cooled to 5° C. via an ice bath. A saturated solution of aqueous sodium carbonate (200 mL) is added. The organic phase is separated and stirred overnight at room temperature with additional saturated aqueous sodium carbonate (200 mL) and a saturated solution of aqueous sodium sulfite (20 mL). The organic phase is separated, washed with brine (2×600 mL portions), dried over magnesium sulfate, filtered, and concentrated to afford a crude yellow oil (172.60 g). The material is fractionally distilled under vacuum (~1×10−2 torr) to afford 38.38 g of a yellow oil that is >94.8% purity by GC.

Preparation of 1-((1-Butoxy-2-butanyl)oxy)-2-butanone (DBnB Ketone)

An Erlenmeyer flask is equipped with a magnetic stir bar and a thermocouple. The flask is charged with 1-((1-butoxy-2-butanyl)oxy)-2-butanol (108.32 g, 496.11 mmol), dichloromethane (250 mL), and TEMPO (0.78 g, 4.98 mmol). The light orange solution is cooled to 5° C. Trichloroisocyanuric acid (121.26 g, 521.77 mmol) is added in small portions via spatula to control the temperature. The resulting orange mixture is stirred at 0° C. via an ice bath for 1 hour, then the ice bath is removed and the mixture is stirred at room temperature for an additional 2 hours. The mixture is filtered and the resulting orange solution is cooled to 5° C. via an ice bath. A saturated solution of aqueous sodium carbonate (100 mL) is added. The resulting yellow mixture is transferred to a separatory funnel for a phase separation. The phases are separated. The organic phase is separated and stirred overnight at room temperature with additional saturated aqueous sodium carbonate (200 mL) and a saturated solution of aqueous sodium sulfite (20 mL). The organic phase is separated, washed with brine (2×300 mL portions), dried over magnesium sulfate, filtered, and concentrated by rotary evaporation to afford a crude yellow oil (111.69 g). The material is fractionally distilled under vacuum (1×10-2 torr) to afford 44.22 g of a light yellow-orange oil that is >94.4% purity by GC.

Preparation of 1-((1-(Hexyloxy)-2-butanyl)oxy)-2-butanone (DBnH Ketone)

An Erlenmeyer flask is equipped with a magnetic stir bar and a thermocouple. The flask is charged with 1-((1-(hexyloxy)-2-butanyl)oxy)-2-butanol (168.00 g, 681.85 mmol), dichloromethane (340 mL), and TEMPO (1.07 g, 6.85 mmol). The light orange solution is cooled to 5° C. Trichloroisocyanuric acid (167.55 g, 720.96 mmol) is added in small portions to control the reaction exotherm. The resulting orange mixture is stirred at 0° C. for 1 hour, and at room temperature for an additional 2 hours. The mixture is filtered and the resulting orange solution is cooled to 5° C. A saturated solution of aqueous sodium carbonate (200 mL) is added. The organic phase is separated and stirred overnight at room temperature with additional saturated aqueous sodium carbonate (200 mL) and a saturated solution of aqueous sodium sulfite (20 mL). The organic phase is separated, washed with brine (2×600 mL portions), dried over magnesium sulfate, filtered, and concentrated to afford a crude yellow oil (163.87 g). The material is fractionally distilled under vacuum (1×10⁻² torr) to afford 11.22 g of a brown-orange oil that is 88.7% purity by GC.

Comparative Solvents

Aromatic 150 (an aromatic hydrocarbon solvent), AMD 810 (an N,N-dialkyl fatty amide), Acetophenone (an aromatic ketone), Cyclohexanone (a cyclic ketone), and ECOSOFT™ Solvent IK (an alkyl ketone) are comparative solvents (collectively, "the Comparative Solvents").

The solubilities of active ingredients in the Ether Ketone Solvents and Comparative Solvents are determined on a saturated solution of a given active ingredient in a given solvent using NMR spectroscopy (Method A, as described below), or by visual evaluation of a concentration ladder of a given active ingredient in a given solvent (Method B, as described below).

Method A: Solubility Determination by NMR Spectroscopy

A saturated solution of a given active ingredient in a solvent is prepared by initially combining the active ingredient (0.8 g) and solvent (1.5 mL) in a vial and stirring vigorously for at least 24 hours. If a homogeneous solution is obtained, additional active ingredient is added until a significant amount of solid remains out of solution. The mixtures (~0.25 mL) are then filtered with a PTFE syringe filter (0.45 μm) into an NMR tube that contained $C_6D_6$ (0.5 mL). The NMR tubes are capped and analyzed on Varian 400 NMR spectrometer equipped with an auto sampler. Proton NMR spectra are referenced to the residual proton peak in the deuterated solvent. Spectra used for quantitation are collected with a 180 second delay between pulses. Spectra are processed in MestReNova (version 11.0.4-18998) by baseline (Bernstein Polynomials) and phase correcting each spectrum followed by integration of all well-resolved solvent and active resonances. Active ingredient weight percentages are estimated by the following formula:

$$\text{wt \%} = 100 * \frac{\text{active integral value} * n \text{ mols} \frac{H}{\text{peak}} * activeMW}{\left(\begin{array}{c}\text{active integral value} * n \text{ mols} \frac{H}{\text{peak}} * activeMW + \\ \text{solvent integral value} * n \text{ mols} \frac{H}{\text{peak}} * solventMW\end{array}\right)}$$

When possible, several well-resolved peaks are used for both solvent and active ingredient, and averaged to provide an estimation of variability in the measurement.

Method B: Solubility Determination by Visual Evaluation

Four-milliliter (mL) vials are charged with active ingredient (10 to 50 wt %), a stir bar, and solvent (90 to 50 wt %). The vials are capped and taped to seal. The vials are secured in a vial rack and shaken on a laboratory shaker for 24 hours at ambient lab temperature of 21° C. and 51% humidity. After 24 hours each sample set is evaluated for solubility of solid.

Example 1

The solubilities of the following four active ingredients in the Ether Ketone Solvents and in Comparative Solvents are evaluated: nitrapyrin, dicamba acid, n-(N-butyl)thiophosphoric triamide ("NBPT"), and 2,4-dichlorophenoxyacetic acid ("2,4-D Acid"). These active ingredients are commonly used in agricultural applications. The results are shown in Table 3 along with the Method used to determine solubility:

TABLE 3

Active Ingredient Solubility (wt %) and Method Used to Determine Solubility

| Solvent | Nitrapyrin | Method | Dicamba Acid | Method | NBPT | Method | 2,4-D Acid | Method |
|---|---|---|---|---|---|---|---|---|
| PnB Ketone | 53.4 | A | 54.0 | A | 32.8 | A | 20.2 | A |
| PnPent Ketone | 49.0 | A | 49.1 | A | 24.2 | A | 17.3 | A |
| PnO Ketone | 42.9 | A | 40.6 | A | 15.9 | A | 12.6 | A |
| DPnB Ketone | 45.4 | A | 52.7 | A | 25.5 | A | 18.3 | A |
| DPnPent Ketone | 41.8 | A | 48.7 | A | 24.4 | A | 15.0 | A |
| DPnH Ketone | 39.0 | A | 48.4 | A | 25.3 | A | 16.4 | A |
| TPnB Ketone | 37.0 | A | 49.7 | A | 22.1 | A | 16.3 | A |
| BnB Ketone | 55.0 | A | 48.9 | A | 21.0 | A | 15.6 | A |
| BnH Ketone | 46.2 | A | 42.5 | A | 13.6 | A | 12.8 | A |
| BnO Ketone | 41.6 | A | 36.5 | A | 10.0 | A | 10.2 | A |
| DBnB Ketone | 42.6 | A | 45.6 | A | 15.7 | A | 13.2 | A |
| DBnH Ketone | 39.8 | A | 42.5 | A | 10.5 | A | 10.9 | A |

TABLE 3-continued

Active Ingredient Solubility (wt %) and Method Used to Determine Solubility

| Solvent | Nitrapyrin | Method | Dicamba Acid | Method | NBPT | Method | 2,4-D Acid | Method |
|---|---|---|---|---|---|---|---|---|
| Aromatic 150 | — | — | <10 | B | <10 | B | <10 | B |
| AMD 810 | 54.2 | A | 64.1 | A | >35.5 | A | >38 | A |
| Acetophenone | 55.4 | A | 49.8 | A | <30 | B | <30 | B |
| Cyclohexanone | 65.2 | A | 62.4 | A | <50 | B | <40 | B |
| ECOSOFT ™ Solvent IK | 36.0 | A | 28.4 | A | <10 | B | <10 | B |

The Ether Ketone Solvents can solubilize nitrapyrin, dicamba acid, NBPT, and 2,4-D acid at a higher weight percent active ingredient in the solvent as compared to the alkyl ketone solvent, ECOSOFT™ Solvent IK. ECOSOFT™ Solvent IK is a high flash point solvent (combustible liquid) with very low solubility in water.

The Ether Ketone Solvents can solubilize dicamba acid, NBPT, and 2,4-D acid at a higher weight percent active ingredient in the solvent as compared to the aromatic hydrocarbon solvent, Aromatic 150. Aromatic 150 is a high flash point solvent (combustible liquid) that is immiscible with water. Aromatic 150 is known to have health and environmental concerns associated with its use.

The Ether Ketone Solvents have equivalent (nitrapyrin) to improved solubility (dicamba acid, NBPT) of active ingredients as compared to acetophenone. Acetophenone is a high flash point compound (combustible liquid) with low solubility of the solvent in water. Acetophenone melts at 20.5° C., making it difficult to handle in cold climates or environments without temperature control. Acetophenone is known to have health concerns associated with its use.

The Ether Ketone solvents provide good (30 wt %) to excellent (>40 wt %) solubility of nitrapyrin, dicamba acid, and NBPT, approaching that found for the cyclic ketone solvent, cyclohexanone. Cyclohexanone is a flammable liquid having higher solubility in water as compared with the Ether Ketone Solvents. Cyclohexanone is known to have health concerns associated with its use.

AMD 810 (a N,N-dialkyl fatty amide) is a commercial low water solubility, polar comparative solvent that is used in the formulation of pesticide emulsifiable concentrates. AMD 810 is a benchmark comparative solvent in such agricultural applications, because it generally can dissolve a variety of active ingredients at high concentration in the formulations. The Ether Ketone solvents provide similar solubilities with AMD 810 for nitrapyrin and NBPT. The Ether Ketone Solvents provide excellent solubility (>50 wt %) for dicamba acid.

Example 2

The solubilities of the following three active ingredients are evaluated: 2-methyl-4-chlorophenoxyacetic acid ("MCPA"), tebuconazole, and bifenthrin. These active ingredients are commonly used in agricultural applications. The results are shown in Table 4 along with the Method used to determine solubility:

TABLE 4

Active Ingredient Solubility (wt %) and Method Used to Determine Solubility

| Solvent | MCPA | Method | Tebuconazole | Method | Bifenthrin | Method |
|---|---|---|---|---|---|---|
| PnB Ketone | 26.8 | A | 25.1 | A | 43.3 | A |
| PnPent Ketone | 22.9 | A | 16.7 | A | 40.2 | A |
| PnO Ketone | 17.1 | A | 12.5 | A | 35.4 | A |
| DPnB Ketone | 23.7 | A | 15.0 | A | 33.4 | A |
| DPnPent Ketone | 22.0 | A | 12.0 | A | 31.8 | A |
| DPnH Ketone | 22.1 | A | 12.5 | A | 35.5 | A |
| TPnB Ketone | 22.5 | A | 10.8 | A | 13.0 | A |
| BnB Ketone | 21.6 | A | 16.9 | A | 42.6 | A |
| BnH Ketone | 17.5 | A | 13.5 | A | 37.3 | A |
| BnO Ketone | 15.3 | A | 12.0 | A | 33.9 | A |
| DBnB Ketone | 17.1 | A | 10.5 | A | 34.7 | A |
| DBnH Ketone | 17.2 | A | 11.2 | A | 33.8 | A |
| Aromatic 150 | <10 | B | <10 | B | <50 | B |
| AMD 810 | >38 | A | >38 | A | >38 | A |
| Acetophenone | <30 | B | <30 | B | <50 | B |
| Cyclohexanone | <50 | B | <50 | B | Sol. at 50 | B |
| ECOSOFT ™ Solvent IK | <10 | B | <10 | B | <40 | B |

The Ether Ketone Solvents can solubilize MCPA and tebuconazole at a higher weight percent of the active ingredient in the solvent as compared to the alkyl ketone solvent, ECOSOFT™ Solvent IK. Several of the Ether Ketone Solvents can provide equivalent or better solubility for bifenthrin as compared to ECOSOFT™ Solvent IK.

The Ether Ketone Solvents can solubilize MCPA and tebuconazole at a higher weight percent of the active ingredient in the solvent as compared to the aromatic hydrocarbon solvent, Aromatic 150. Several of the Ether Ketone Solvents provide equivalent solubility of bifenthrin as compared to Aromatic 150.

The Ether Ketone Solvents provide solubility of MCPA equivalent to acetophenone. Several of the Ether Ketone Solvents provide equivalent solubilities of tebuconazole and bifenthrin as compared to acetophenone.

The Ether Ketone Solvents provide good solubility for MCPA and tebuconazole as compared to a cyclic ketone, cyclohexanone. Several of the Ether Ketone Solvents provide excellent solubility for bifenthrin as compared to cyclohexanone.

Example 3

The solubilities of certain of the Ether Ketone Solvents in water are determined by adding water (~10 to 50 grams) to a tared vial equipped with a stir bar. The weights of water are noted. The specified solvent is added dropwise using a 10 μL syringe until the mixture appeared to have solvent droplets suspended in the water. The mixture is weighed again and the weight percent solubility of the Ether Ketone Solvent in water is calculated.

The solubilities of water in certain of the Ether Ketone Solvents are also evaluated. A vial is charged with 5 grams of the specified solvent, and 3 Å activated molecular sieves (~300 mg) are added. The vial is capped and the solvent left to dry for several days. The mixtures are filtered using a 0.2 μm syringe filter into a tared 20 mL vial and the weights are noted. Water is then added using a 10 μL syringe until the mixture appeared to have water droplets on the bottom of the vial. The mixture is weighed again and the weight percent solubility of water in the Ether Ketone solvent is calculated. The temperature in the lab is 30° C. at the time of the water solubility measurements.

The solubilities of selected comparative solvent chemistries in water and water in selected comparative solvent chemistries were obtained from open literature. HALLCOMID M-8-10 is a commercial N,N-dialkyl fatty amide solvent available from Stepan.

The results are shown in Table 5:

TABLE 5

| | Solubility (wt %) | |
| --- | --- | --- |
| | In Water | Water In |
| PnB Ketone | 0.20 | 0.005 |
| DPnB Ketone | 0.20 | 0.03 |
| DPnH Ketone | 0.22 | 0.03 |
| BnB Ketone | 0.43 | 0.11 |
| BnH Ketone | 0.22 | 0.02 |
| Aromatic 150 | Immiscible | — |
| HALLCOMID ® M-8-10 | 0.12 | 22 |
| Acetophenone | 0.61 | — |
| Cyclohexanone | 2.5 | — |
| ECOSOFT ™ Solvent IK | 0.002 | 0.3 |

The solubilites in water of the Ether Ketone Solvents are low, <0.5 wt %, indicating they have the appropriate solubilities in water for use in agriculture related applications such as in emulsifiable concentrate compositions. The Ether Ketone Solvents have solubility in water comparable to comparative N,N-dialkyl fatty amide solvent HALLCOMID M-8-10. The solubilities of the Ether Ketone Solvents in water are lower than aromatic ketone acetophenone, and much lower than the cyclic ketone cyclohexanone. The solubilities of water in the Ether Ketone Solvents are very low, <0.2 wt %. The solubilities of water in the Ether Ketone Solvents are lower than comparative alkyl ketone solvent ECOSOFT™ Solvent IK and much lower than comparative N,N-dialkyl fatty amide solvent HALLCOMID M-8-10. Low solubility of water in a solvent is a beneficial property for solvents used in agriculture related applications such as in emulsifiable concentrate compositions because this can improve the stability of the emulsifiable concentrate composition towards active ingredient precipitation or crystallization.

We claim:
1. A composition comprising:
(a) 5 weight percent or more of a compound selected from at least one of a pyrethroid, organophosphate, organosulfite, carbamate, cyclohexanedione, isoxazole, chlorophenoxyacetic, anilide, chloroacetanilide, chloromethoxy benzoic, oxyacetanilide, strobilurin, triazole, triazapentadiene, synthetic auxin, aryloxyphenoxy propionate, benzofuran, pyrimidine, phenylpyrazole, phenylurea, diphenyl ether, hydroxybenzonitrile, thiophosphoric triamide, of chloropyridine;
and
(b) an ether ketone solvent according to Formula 1:

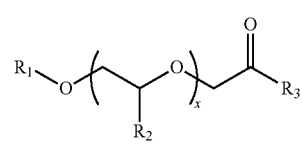

(Formula 1)

wherein $R_1$ is a linear or branched alkyl group having 4 to 8 carbon atoms, x is 1 or 2, and $R_2$ and $R_3$ are $CH_3$ or $R_2$ and $R_3$ are $CH_2CH_3$;
wherein the compound is solubilized in the ether ketone solvent.

2. The composition of claim 1, wherein the composition further comprises less than 50 weight percent of an aromatic hydrocarbon solvent.

3. The composition of claim 1, wherein the composition further is free of an aromatic hydrocarbon solvent.

4. The composition of claim 1, wherein the composition further comprises less than 50 weight percent of an N,N-dialkyl fatty amide solvent.

5. The composition of claim 1, wherein the composition is further free of an N,N-dialkyl fatty amide solvent.

6. The composition of claim 1, wherein the composition further comprises less than 50 weight percent of aromatic, alkyl, and cyclic ketone solvents.

7. The composition of claim 1, wherein the composition is further free of aromatic, alkyl, and cyclic ketone solvents.

8. The composition of claim 1, wherein the composition comprises up to 20 weight percent of the one or more component (a) compounds and 10 to 80 weight percent of the ether ketone solvent.

9. The composition of claim 8, wherein the ether ketone solvent is the only solvent for the composition.

10. The composition of claim 1, wherein the composition comprises 21 to 50 weight percent of the one or more component (a) compounds and 10 to 50 weight percent of the ether ketone solvent.

11. The composition of claim 10, wherein the ether ketone solvent is the only solvent for the composition.

12. The composition of claim 1, wherein $R_1$ is a linear alkyl group having 4 or 5 carbon atoms, wherein $R_2$ and $R_3$ are $CH_3$.

13. The composition of claim 1, in which the compound is at least one of bifenthrin, tebuconazole, 2-methyl-4- chlorophenoxyacetic acid, 2,4-dichlorophenoxyacetic acid, N-(n-butyl) thiophosphoric triamide, dicamba acid, and nitrapyrin.

14. The composition of claim 1, further comprising one or more of a surfactant, emulsifier, dispersant, humectant, adjuvant, antioxidant or colorant wherein the one or more of a surfactant, emulsifier, dispersant, humectant, adjuvant, antioxidant or colorant comprises from greater than zero to less than or equal to 15 weight percent of the composition.

* * * * *